US012598562B2

(12) United States Patent
Palenius et al.

(10) Patent No.: US 12,598,562 B2
(45) Date of Patent: *Apr. 7, 2026

(54) SIGNALING TA-OFFSET IN NR

(71) Applicant: TELEFONAKTIEBOLAGET LM ERICSSON (PUBL), Stockholm (SE)

(72) Inventors: Torgny Palenius, Barsebäck (SE); Magnus Sandgren, Staffanstorp (SE); Magnus Larsson, Sollentuna (SE); Muhammad Kazmi, Sundbyberg (SE); Robert Baldemair, Solna (SE); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,288

(22) Filed: May 7, 2024

(65) Prior Publication Data

US 2024/0365255 A1      Oct. 31, 2024

Related U.S. Application Data

(63) Continuation of application No. 16/765,013, filed as application No. PCT/IB2018/058934 on Nov. 13, 2018, now Pat. No. 11,979,842.

(Continued)

(51) Int. Cl.
*H04W 56/00*        (2009.01)
*H04L 5/14*        (2006.01)

(52) U.S. Cl.
CPC ........... *H04W 56/0005* (2013.01); *H04L 5/14* (2013.01); *H04W 56/0045* (2013.01)

(58) Field of Classification Search
CPC .. H04W 56/0005; H04W 56/0045; H04L 5/14
See application file for complete search history.

(56) References Cited

U.S. PATENT DOCUMENTS 10,925,046 B2 *  2/2021  Maaref ................. H04L 5/0048
11,451,364 B2 *  9/2022  Jin ......................... H04W 76/27
(Continued)

FOREIGN PATENT DOCUMENTS

CN        105264792 A      1/2016
WO        2016092959 A1    6/2016

OTHER PUBLICATIONS

3GPP TS 36.211 v14.4.0, "3rd Generation Partnership Project; Technical Specification Group Radio Access Network; Evolved Universal Terrestrial Radio Access (E-UTRA); Physical channels and modulation (Release 14)", Sep. 2017.
(Continued)

*Primary Examiner* — Bailor C Hsu

(57) ABSTRACT

A method performed by a wireless device for determining a timing advance (TA) offset in a new radio (NR) network is described herein along with associated network devices and systems. An exemplary method includes obtaining an indication of whether a carrier frequency of the NR network coexists with a carrier frequency of a long term evolution (LTE) network, determining, based on whether the carrier frequency of the NR network coexists with carrier frequency of the LTE network, a TA offset for uplink transmission; and transmitting an uplink transmission using the determined TA offset.

19 Claims, 15 Drawing Sheets

Related U.S. Application Data

(60) Provisional application No. 62/588,037, filed on Nov. 17, 2017.

(56) References Cited

U.S. PATENT DOCUMENTS

| | | | |
|---|---|---|---|
| 11,622,365 | B1 | 4/2023 | Ibrahim et al. |
| 2007/0149206 | A1 | 6/2007 | Wang et al. |
| 2014/0348122 | A1 | 11/2014 | Li et al. |
| 2015/0188650 | A1 | 7/2015 | Au et al. |
| 2015/0230268 | A1 | 8/2015 | Chen et al. |
| 2015/0245307 | A1 | 8/2015 | Chen et al. |
| 2016/0044584 | A1 | 2/2016 | Jung et al. |
| 2017/0215157 | A1 | 7/2017 | Yang et al. |
| 2017/0257774 | A1 | 9/2017 | Ghosh et al. |
| 2017/0325248 | A1 | 11/2017 | Mizusawa |
| 2018/0139747 | A1 | 5/2018 | Hosseini et al. |
| 2018/0213468 | A1 | 7/2018 | Chatterjee et al. |
| 2018/0234930 | A1 | 8/2018 | Chen et al. |
| 2018/0279303 | A1 | 9/2018 | Sun et al. |
| 2018/0302915 | A1 | 10/2018 | Einhaus et al. |
| 2018/0343697 | A1 | 11/2018 | Hsu et al. |
| 2019/0037608 | A1 | 1/2019 | Harada et al. |
| 2019/0150141 | A1 * | 5/2019 | Irukulapati .............. H04L 5/14 370/280 |
| 2019/0227962 | A1 | 7/2019 | O'Shea et al. |
| 2020/0205156 | A1 * | 6/2020 | Adjakple ........... H04W 52/365 |
| 2020/0337011 | A1 | 10/2020 | Jiang et al. |
| 2021/0385813 | A1 | 12/2021 | Irukulapati et al. |
| 2022/0124707 | A1 | 4/2022 | Bae et al. |
| 2022/0174620 | A1 * | 6/2022 | Cha .................... H04W 56/006 |
| 2022/0311576 | A1 * | 9/2022 | Sun ....................... H04L 1/0013 |
| 2022/0322372 | A1 * | 10/2022 | Takeda .................. H04J 11/005 |
| 2023/0354391 | A1 * | 11/2023 | Babaei ................. H04L 5/0053 |

OTHER PUBLICATIONS

3GPP TS 38.133 V0.3.0, "3rd Generation Partnership Project; Technical Specification Group Radio Access Network; New Radio(NR); Requirements for support of radio resource management (Release 15)", Nov. 2017.

Ericsson, "Even Further Analysis of UE Initial Transmit Timing Requirement", 3GPP TSG RAN WG4 Meeting #85, R4-1713648, Nov. 27-Dec. 1, 2017, Reno, USA.

Ericsson, "TP to TS 38.133 v0.3.0: UE Transmit Timing Accuracy Requirements", 3GPP TSG RAN WG4 Meeting #85, R4-1713649, Nov. 27-Dec. 1, 2017.

Ericsson, "TP to TS 38.133 v0.3.0: UE Transmit Timing Accuracy Requirements", 3GPP TSG RAN WG4 Meeting #85, R4-1713650, Nov. 27-Dec. 1, 2017.

Huawei et al., R1-1704199, "Considerations of NR UL operation for LTE-NR coexistence", 3GPP TSG RAN WG1 Meeting #88bis, R1-1704199, Apr. 3-7, 2017.

LG Electronics, R1-1717973, "Discussion on carrier aggregation for NR", 3GPP TSG RAN WG1 Meeting 90bis, R1-1717973, Prague, CZ, Oct. 9-13, 2017.

Mediatek Inc., "Measurement Gap Design for EN-DC", 3GPP TSG-RAN WG2 #100, R2-1712886, Nov. 27-Dec. 1, 2017, Reno, USA.

RAN4, "Signaling of TA_Offset", 3GPP TSG-RAN WG4 Meeting 85, R4-1713613, Nov. 27-Dec. 1, 2017, Reno, USA.

Samsung, "RRC signaling to support LTE+NR Co-existence", 3GPP TSG-RAN WG2 99Bis Meeting, R2-1711819, Oct. 9-13, 2017, Prague, Czech Republic.

* cited by examiner

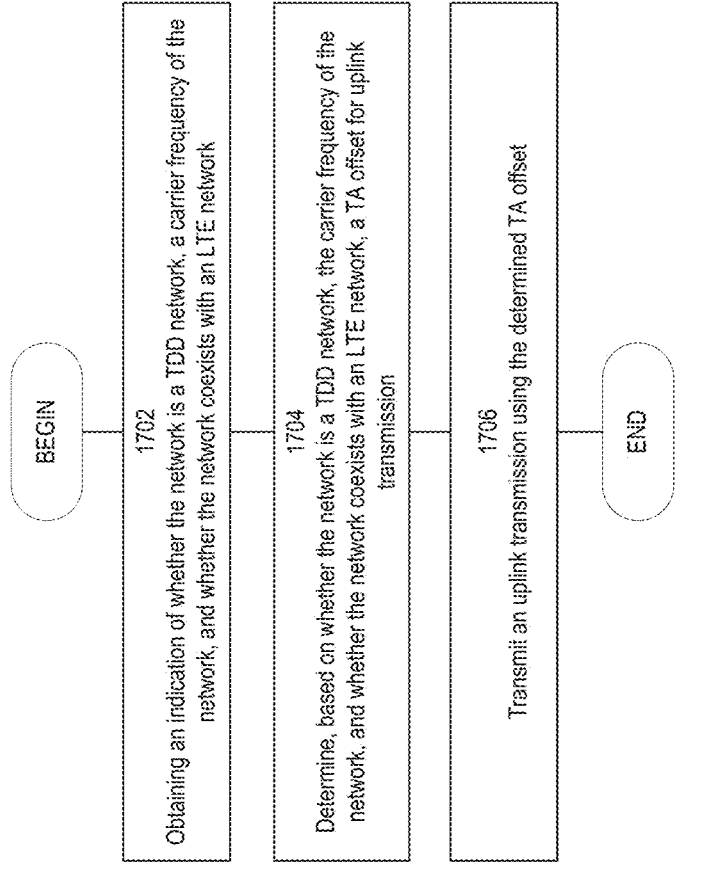

BEGIN

1702
Obtaining an indication of whether the network is a TDD network, a carrier frequency of the network, and whether the network coexists with an LTE network 1704
Determine, based on whether the network is a TDD network, the carrier frequency of the network, and whether the network coexists with an LTE network, a TA offset for uplink transmission 1706
Transmit an uplink transmission using the determined TA offset

END

FIG. 17

1800
Virtual Apparatus

1802
Receiving Unit

1804
Determining Unit

SIGNALING TA-OFFSET IN NR

RELATED APPLICATIONS

This application is a continuation of U.S. patent application Ser. No. 16/765,013, filed on May 18, 2020, now granted as U.S. Pat. No. 11,979,842 on May 7, 2024, which is a national stage application of International Patent Application No. PCT/IB2018/058934, filed Nov. 13, 2018, which claims the benefit of U.S. Provisional Application No. 62/588,037 filed on Nov. 17, 2017 and entitled "SIGNALING TA-OFFSET IN NR," the disclosures of which are hereby incorporated by reference in their entirety.

TECHNICAL FIELD

The present disclosure relates, in general, to wireless communications and, more particularly, systems and methods for ensuring proper timing when changing between uplink and downlink communication.

BACKGROUND

In long term evolution (LTE), the transmit timing from a user equipment (UE) is based on two parameters—a dynamic $N_{TA}$ and a fixed $N_{TA,offset}$. This defines the time offset between the downlink timing and the uplink timing. This is described in 36.211 v14.4.0 section 8, for LTE. One example of the downlink frame timing for NR is similar to TDD, where only a subset of the slots in a radio frame is transmitted.

As shown in FIG. 1, transmission of the uplink radio frame number i from the UE is to start $(N_{TA}+N_{TA\ offset})\times T_s$ seconds before the start of the corresponding downlink radio frame at the UE, where $0 \leq N_{TA} \leq 4096$ if the UE is configured with a SCG and $0 \leq N_{TA} \leq 20512$ otherwise. For frame structure type 1 $N_{TA\ offset}=0$ and for frame structure type 2 $N_{TA\ offset}$ 624 unless stated otherwise. Note that not all slots in a radio frame may be transmitted.

The receive uplink timing in the base station from all UEs transmitting uplink dedicated signals in the cell, independent of the distance to the base station, should reach the base station in approximately the same time for the base station to demodulate the signals from all the UEs in the same receiver FFT process. The uplink timing from the UE is therefore controlled by the base station with the TA (Time Adjustment) command, which signals the parameter $N_{TA}$ to the UE. The parameter is signaled to a UE in the connected mode in a MAC command and has a granularity of about 0.5 μs per step (e.g., each step is 16 Ts where 1 Ts=1/(15000*2048) seconds=32.55 ns). NR is similar but has finer granularity options when it comes to sizes, if sub-carrier spacing wider than 15 kHz is used.

SUMMARY

One general aspect includes a method including steps of obtaining an indication of whether the network is a time division duplex (TDD) network, a carrier frequency of the network, and whether the network coexists with a long term evolution (LTE) network. The method also includes determining, based on whether the network is a TDD network, the carrier frequency of the network, and whether the network coexists with an LTE network, a TA offset for uplink transmission. The method also includes transmitting an uplink transmission using the determined TA offset.

Implementations may include one or more of the following features. The method where obtaining the indication of whether the network coexists with an LTE network includes receiving signaling from a network node. The method of any of the previous claims, further including: providing user data and forwarding the user data to a host computer via the transmission to the base station. The method of any of the previous features and further including: obtaining user data and forwarding the user data to a host computer or a wireless device. The method where obtaining whether the network is a TDD network, the carrier frequency of the network, and whether the network coexists with an LTE network includes receiving signaling from a network node, where the signaling includes an explicit TA offset value. The method may also include determining the TA offset includes using the received explicit TA offset value. The method where the network is not a TDD network and the TA offset is equal to zero. The method where the network is a TDD network, the carrier frequency of the network is below a threshold value, the network does not coexist with an LTE network, and the TA offset is equal to a first value greater than 0. The method where the threshold value is 6 GHz and the TA offset is 6 ps. The method where the network is a TDD network, the carrier frequency of the network is above a threshold value, the network does not coexist with an LTE network, and the TA offset is equal to a second value greater than 0. The method where the threshold value is 6 GHz and the TA offset is 13 ps. The method where the network is a TDD network, the carrier frequency of the network is above a threshold value, the network coexists with an LTE network, and the TA offset is equal to a third value greater than 0. The method where the threshold value is 6 GHz and the TA offset is 20 ps. Implementations of the described techniques may include hardware, a method or process, or computer software on a computer-accessible medium.

Another general aspect includes a method performed by a base station for signaling a timing advance (TA) offset to a wireless device in a new radio (NR) network, the method including: sending an indication of a timing offset to the wireless device; and receiving an uplink transmission using the indicated timing offset.

Implementations may include one or more of the following features. The method where the indication of the timing offset includes an explicit indication of an amount of time. The method where the network is not a TDD network and the TA offset is equal to zero. The method where the network is a TDD network, the carrier frequency of the network is below a threshold value, the network does not coexist with an LTE network, and the TA offset is equal to a first value greater than 0. The method where the threshold value is 6 GHz and the TA offset is 6 μs. The method where the network is a TDD network, the carrier frequency of the network is above a threshold value, the network does not coexist with an LTE network, and the TA offset is equal to a second value greater than 0. The method where the threshold value is 6 GHz and the TA offset is 13 μs. The method where the network is a TDD network, the carrier frequency of the network is above a threshold value, the network coexists with an LTE network, and the TA offset is equal to a third value greater than 0. The method where the threshold value is 6 GHz and the TA offset is 20 μs. The method where the indication of the timing offset includes an indication of whether the network coexists with an LTE network. Implementations of the described techniques may include hardware, a method or process, or computer software on a computer-accessible medium.

Another general aspect includes a wireless device for determining a timing advance (TA) offset in new radio (NR) network, the wireless device including: processing circuitry configured to perform any of the steps of any of the methods above; and power supply circuitry configured to supply power to the wireless device. Other embodiments of this aspect include corresponding computer systems, apparatus, and computer programs recorded on one or more computer storage devices, each configured to perform the actions of the methods.

Another general aspect includes a base station for signaling a timing advance (TA) offset to a wireless device in a new radio (NR) network, the base station including: processing circuitry configured to perform any of the steps of any of the methods above; and power supply circuitry configured to supply power to the wireless device. Other embodiments of this aspect include corresponding computer systems, apparatus, and computer programs recorded on one or more computer storage devices, each configured to perform the actions of the methods.

Yet another general aspect includes a user equipment (UE) for determining a timing advance (TA) offset in new radio (NR) network.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 17: Method in accordance with some embodiments.

These figures will be better understood by reference to the following detailed description.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In LTE, the parameter $N_{TA,offset}$ is fixed, based on the FDD or TDD mode. In FDD, where frame structure 1 is used, $N_{TA,offset}=0$. In TDD, where frame structure 2 is used, $N_{TA,offset}=624$. $N_{TA,offset}$ for a TDD uplink transmission is thereby 624*32.55 ns=20.3 us.

Figure 2:
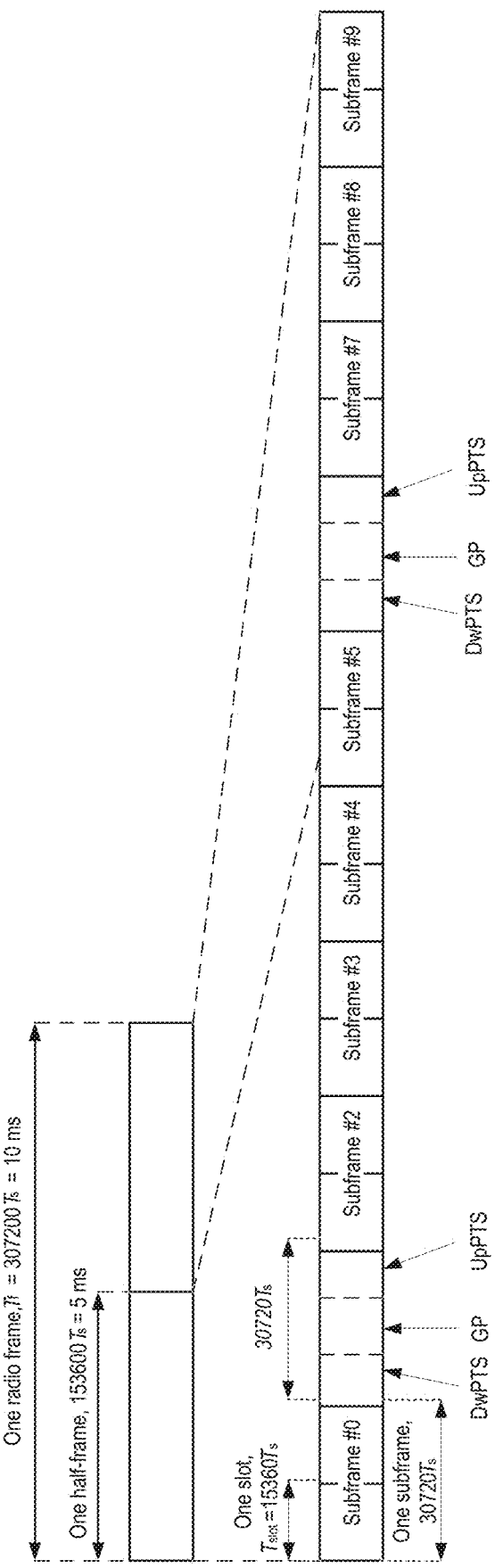
FIG. 2: LTE TDD frame.

The reason the additional time alignment offset is needed in TDD is that in TDD the base station does not receive and transmit simultaneously. In LTE TDD, the downlink part of the special subframe (DwPTS) and the uplink part of the special subframe (UpPTS) are separated by a guard period (GP), as seen in FIG. 2 below. When the switching between uplink and downlink subframes is performed, there is no gap defined in the frame structure. By starting transmitting the uplink in advance of the downlink subframe, offset by TA,Offset, a gap of length TA,Offset is created as seen in FIG. 3, which represents the guard period allocated for the UL to DL switch.

The TA_offset can be directly derived from the TX transient times and the cell phase synchronization errors both defined in the 3GPP specifications.

Figure 1:
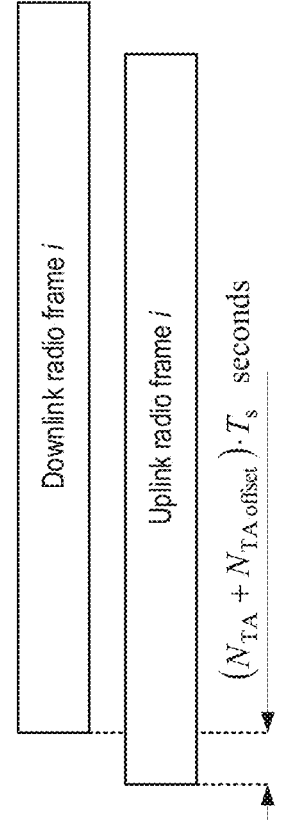
FIG. 1: Uplink-downlink timing relation (based on TS 36.211 v14.4.0).
Figure 3:
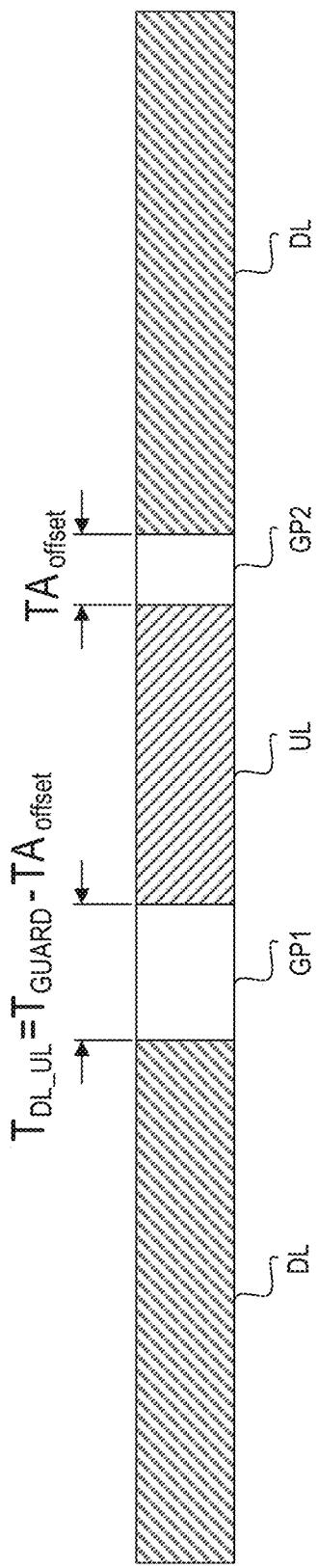
FIG. 3: LTE TDD frame structure.
Figure 4B:
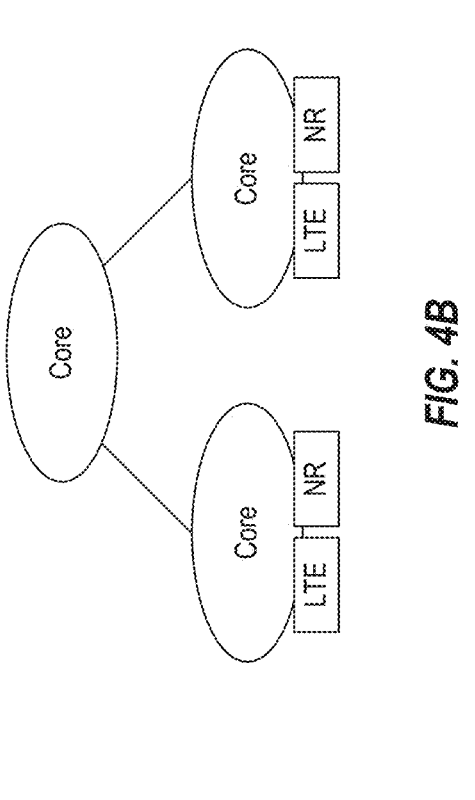
FIGS. 4A, 4B, 4C, and 4D. NR deployment examples: (4A) non-centralized, (4B) co-sited, (4C) centralized, and (4D) shared.
Figure 4D:
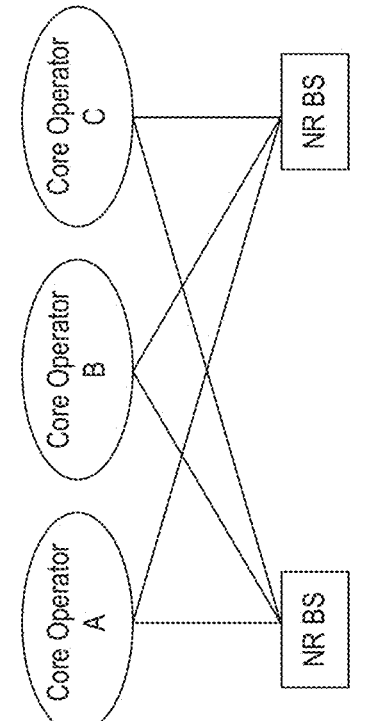
Figure 4A:
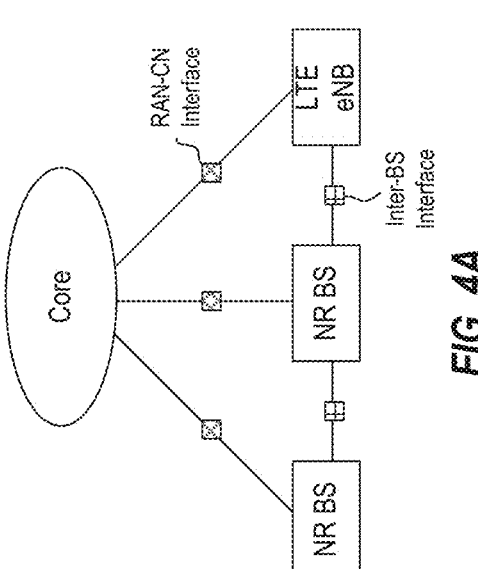
Figure 4C:
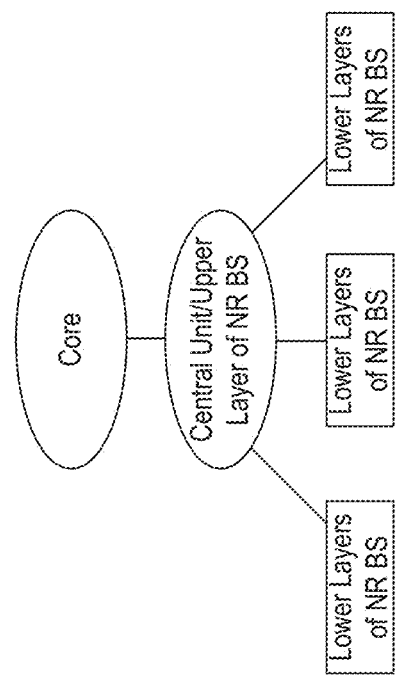

Note that the gaps in FIG. 3 are shown at the UE side. At the base station side, downlink is transmitted T_prop earlier and the uplink is received T_prop later, where T_prop is the propagation time between the base station and the UE. This is compensated by the timing alignment command received by MAC signaling and shown in FIG. 1, $N_{TA}$, giving the proper gaps in the base station.

The rest of the guard period, the guard period allocated for the DL to UL switch) ($T_{DL-UL}$ in FIG. 3) is used to switch from Tx in the base station to Rx in the base station and to decrease the interference from neighbor base stations to the actual (e.g., serving) base station. The transmission from the neighbor cells is delayed by the propagation delay equal to distance between the base stations and also offset by a potential synchronization error between the base stations. Therefore, the base station must wait this guard period until the interference level from the other base stations decreases.

The length of the total guard period for both DL to UL and UL to DL guards ($T_{GUARD}$ below) is configurable in LTE between 1 symbol up to 10 symbols (still the TA offset part is fixed) to allow for different deployments scenarios with respect to cell sizes and interference situations still minimizing overhead to allow for efficient spectrum utilization.

TABLE 1

| | LTE TDD configurations | | | | | |
|---|---|---|---|---|---|---|
| | Normal cyclic prefix in downlink | | | Extended cyclic prefix in downlink | | |
| Special | | UpPTS | | | UpPTS | |
| subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

The UE accesses the base station first time by transmitting a random access preamble. The preamble is received in the base station during a specified UL subframe. The UE performs random access transmission to a cell during various procedures e.g. during the initial access, during cell change, after losing synchronization with respect to the cell, etc. The initial access is performed for cell selection. Examples of cell change are handover, cell reselection, RRC re-establishment, RRC connection release with redirection etc.

NR and LTE may coexist. Examples of NR deployment scenarios are shown in FIG. 4A-D. As shown in these figures, the NR base station (e.g., gNB) can be geographically co-located with LTE BS (e.g. eNB) or they can be located at different sites. In both cases the NR and LTE can coexist on the same carrier frequency or on neighbor frequencies. When NR and LTE coexistence is employed in TDD system on same or neighbor frequencies (e.g., LTE and NR in the same area such as in co-located NR and LTE BSs) they may use the same TDD configuration, which includes the TA offset, to minimize interference.

One example is that the unused resources within the LTE carrier can be used for transmitted NR signals. This in particular shall be used in an uplink carrier. There are two cases of this NR-LTE coexistence in uplink: UE transparent and UE non-transparent. In the former case, the same uplink carrier is shared between LTE and NR by two different UEs (e.g., UE1 transmits using LTE while UE2 transmits using NR). In the latter case, the same uplink carrier is used by the same UE for transmitting both LTE and NR signals (e.g., similar to uplink carrier aggregation).

There currently exist certain challenge(s). Today in LTE the $N_{TA}$,Offset can have one of two values, 0 for FDD and 624*Ts (20 us) for TDD as stated in 36.211, section 8. Because the offset is only based on if FDD or TDD is used, the offset value is known by the UE. Thus, the UE can set the offset without any signaling.

The situation in NR is more complex. The offset depends on the duplex method (FDD or TDD), whether it is coexisting with LTE, and on the frequency band. The duplex method and the frequency band is known by the UE, but the coexistence between LTE and NR is not known.

With the existing solution, only one value is possible for FDD and one for TDD. Therefore, using the existing solution means the longest possible offset is needed in all cases.

The TA,Offset uses a part of the total guard period GP in a TDD configuration. The total length of the total guard period is based on two parts. The first part is the TA,Offset used as a guard period between the uplink subframe and the downlink subframe in the base station. The second part is the guard period in the base station between a downlink subframe and the next uplink subframe. The latter also needs to accommodate a round trip time RTT between the base station and the UE. For a fixed propagation delay, with a shorter TA,offset the guard period between downlink and uplink is increased and for the same length of the total guard period a larger cell can be supported.

The guard period between the downlink and uplink subframe is also needed to allow time for down ramping the downlink transmitted signal and to decrease the received downlink signal from the neighbor cell downlink TDD transmission which can occur due to synchronization error between the base stations and for the propagation delay. For a fixed total guard period, a larger TA offset gives a smaller isolation at the downlink to uplink switch and then a relative higher interference from distant base stations.

By minimizing the total guard period in the TDD frame structure, there is less overhead due to guard periods and the capacity is enhanced which is especially important for NR, because NR targets low latency which for TDD implies more frequent TRX switching. Therefore, it is important from capacity and interference point of view to use an optimal and low TA,Offset when possible.

When accessing a base station, the timing of the uplink subframes in a base station is defined by the time offset between downlink and uplink subframes, TA_offset. Therefore, the time offset needs to be known by the UE when it starts to transmit the random access preamble. Otherwise the transmitted random access channel (RACH) preamble may be received outside the defined uplink subframe in the base station and it is not detected or alternatively the performance is degraded.

Certain aspects of the present disclosure and their embodiments may provide solutions to these or other challenges. Minimizing the total guard period (GP) in the TDD frame structure includes minimizing the TA_offset. Because not all parameters for selecting the time offset are available in the UE, in particular embodiments the base station signals TA,offset value (or pre-defined identifier of the TA_offset value) to the UE. Some embodiments may signal the information about the status of the LTE and NR coexistence on one or more cells, meaning either there is a coexistence problem or not. In some embodiments, the actual offset with a granularity similar to the timing advance can be sent to the UE and thereby tune the TA_offset based on other parameters such as size of cell, etc.

Because the offset is needed when the RACH preamble is sent when the UE enters the cell for the first time, the parameter needs to be known by the UE before accessing the base station (e.g., gNB). Therefore, the offset, in particular embodiments, is sent in the broadcast information (e.g., in SIB) from the NR base station (e.g., gNB). As an example, the TA,offset values can be pre-defined.

In one example embodiment, the base station can signal a pre-defined identifier (e.g., one bit) informing the UE whether there is a coexistence situation with LTE or not. The TA_offset is specified in the NR specifications based on the scenario. For example, if LTE and NR do not coexist on the same TDD carrier, then the base station configures the UE with TA_offset=N2; but if LTE and NR coexist on the same TDD carrier, then the base station configures the UE with TA_offset=N3, where N2<N3 (e.g., N2=13 μs and N3=20μ (i.e. 624 Ts).

In other embodiments, the actual TA_offset to be used by the UE may be sent to the UE, with a granularity of the timing advance commands used in connected mode, or a multiple of that one. The TA_offset can be tuned for different scenarios and implementations.

If the UE does not have information about NR and LTE coexistence, then all NR sites operating in LTE bands would have to presuppose coexistence. This would mean a larger NR TA_Offset in all NR cells and more NR overhead due to the longer GP needed, for this case, compared to a smaller TA_Offset and a smaller GP. With signaling of TA_offset for LTE-NR coexistence operation, the TA_offset can be adapted to the colocation situation; using longer TA_offset for NR sites that are co-located with LTE in the same band and shorter TA_offset, and less overhead, for NR sites that are not co-located.

There are, proposed herein, various embodiments which address one or more of the issues disclosed herein. According to some embodiments, a method performed by a wireless device for determining a timing advance (TA) offset in new radio (NR) network comprises: obtaining an indication of whether the network is a time division duplex (TDD) network, a carrier frequency of the network, and whether the network coexists with a long term evolution (LTE) network; determining, based on whether the network is a TDD network, the carrier frequency of the network, and whether the network coexists with an LTE network, a TA offset for uplink transmission; and transmitting an uplink transmission using the determined TA offset.

In particular embodiments, obtaining the indication of whether the network coexists with an LTE network comprises receiving signaling from a network node. The signaling may include an explicit TA offset value, and determining the TA offset comprises using the received explicit TA offset value.

In particular embodiments, the network is not a TDD network and the TA offset is equal to zero. The network may be a TDD network, the carrier frequency of the network may be below a threshold value (e.g., 6 GHz), the network may not coexist with an LTE network, and the TA offset is equal to a first value (e.g., 6 μs). The network may be a TDD network, the carrier frequency of the network may be above a threshold value (e.g., 6 μs), the network may not coexist with an LTE network, and the TA offset may be equal to a second value (e.g., 13 μs). The network may be a TDD network, the carrier frequency of the network may be above a threshold value (e.g., 6 GHz), the network may coexist with an LTE network, and the TA offset may be equal to a third value (e.g., 20 μs).

Certain embodiments may provide one or more of the following technical advantage(s). An advantage of particular embodiments is that the UE is informed about the best time offset for the uplink slot structure before it starts to transmit. The time offset is used to, in TDD, create a gap between the uplink subframe and the downlink subframe in the base station. This gap enables the base station to stop the uplink receiver radio and ramp the downlink transmitter power.

When minimizing the TA_offset, the total guard period in a TDD frame structure can be minimized. In LTE, the length of the guard period can be varied between 1 and 10 symbols. With a correct uplink timing of the RACH preamble, the ramping in the base station between the downlink subframes and the uplink subframes is not interfering with the received random access preamble.

For embodiments that send the TA_offset in the broadcast signaling, the interference situation as well as the capacity in the cell can be enhanced with a size of the guard period minimized to the actual scenario which is beneficial because NR targets low latency which means more frequent TRX switching in a TDD system.

If the UE does not have the information, then all NR sites operating in LTE bands would have to presuppose coexistence. This would mean a larger NR TA_Offset in all NR cells and more NR overhead due to the longer GP needed, for this case, compared to a smaller TA_Offset and a smaller GP.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the Appendix.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), target device, a sensor equipped with UE, iPAD, Tablet, mobile terminals, smart phone, laptop embedded equipped (LEE), laptop mounted equipment (LME), USB dongles, Customer Premises Equipment (CPE) etc.

Also in some embodiments generic terminology "network node", is used. It can be any kind of network node which may comprise of a radio network node such as base station, radio base station, base transceiver station, base station controller, network controller, gNB, en-gNB, nr-eNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node (e.g. location server, SMLC, E-SMLC etc), MDT node, etc.), or even an external node (e.g., 3$^{rd}$ party node, a node external to the current network), etc. The network node may also comprise a test equipment. The term "radio node" used herein may be used to denote a UE or a radio network node.

The embodiments are applicable to single carrier as well as to multicarrier operation of the UE. Examples of multicarrier operation are carrier aggregation (CA), multi-connectivity (MC) etc. In CA operation the UE is able to receive and/or transmit data to more than one serving cells. In MC the UE is served by at least two serving cells (e.g. PCell and PSCell) operated by two different network nodes. Special example of MC is dual connectivity (DC) e.g. LTE-NR DC. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

The term "signaling" used herein may comprise any of: high-layer signaling (e.g., via RRC, NAS message or a like), lower-layer signaling (e.g., via a MAC, a physical control channel etc), or a combination thereof. The signaling may be implicit or explicit. The signaling may further be unicast, multicast or broadcast. The signaling may also be directly to another node or via a third node.

Particular embodiments include methods in both a user equipment (UE) and a network node. The embodiments are described in more detail below:

Because the uplink subframe in LTE in the base station is offset from the downlink subframes by the $N_{TA,offset}$ as described in the Introduction, the UE also needs to know the offset when accessing the network (e.g., when performing a random access to a cell). Then the UE knows when the random access preamble shall be transmitted. Therefore, it is advantageous if the UE knows the TA,offset before starting to transmit in the uplink.

When NR and LTE coexistence is used in TDD system (e.g., LTE and NR in the same area such as in co-located NR and LTE BSs), they may use the same TDD configuration, which includes the TA offset but not necessarily otherwise. Transmit transition times defining the TA offset, as mentioned above, are different between LTE and NR and also within different NR frequency ranges. In NR, the transition times depend on carrier frequency range; but the cell phase synchronization between frame timing of cells is the same (e.g., 3 μs regardless of the frequency).

The UE shall have capability to follow the frame timing change of the connected gNB. The uplink frame transmission takes place $(N_{TA}+N_{TA\ offset})\times T_c$ before the reception of the first detected path (in time) of the corresponding downlink frame from the reference cell. UE initial transmit timing accuracy, maximum amount of timing change in one adjustment, minimum and maximum adjustment rate are defined in the following requirements. The value of $N_{TA\ offset}$ depends on the duplex mode of the cell in which the uplink transmission takes place, frequency range (FR) and whether LTE-NR coexistence is configured in the cell or not. $N_{TA\ offset}$ is defined in Table 2.

TABLE 2

The Value of $N_{TA\ offset}$

| Duplex Mode of cell used for uplink transmission | $N_{TA\ offset}$ |
|---|---|
| FDD in FR1 or FR2 | 0 (Note) |
| TDD in FR1 with LTE-NR coexistence | 39936 |

TABLE 2-continued

The Value of $N_{TA\ offset}$

| Duplex Mode of cell used for uplink transmission | $N_{TA\ offset}$ |
|---|---|
| TDD in FR1 without LTE-NR coexistence | 25560 |
| TDD in FR2 | 11776 |

Note:
Regardless of whether LTE-NR coexistence is configured or not in FR1

The UE initial transmission timing error shall be less than or equal to $\pm T_c$ where the timing error limit value $T_c$ is specified in a table. This requirement applies: (a) when it is the first transmission in a DRX cycle for PUCCH, PUSCH and SRS or it is the PRACH transmission; and (b) When it is not the first transmission in a DRX or there is no DRX, and when it is the transmission for PUCCH, PUSCH and SRS transmission except when the timing advance in clause 7.3 is applied.

The reference point for the UE initial transmit timing control requirement shall be the downlink timing of the reference cell minus $(N_{TA}+N_{TA\ offset})\times T_c$. The downlink timing is defined as the time when the first detected path (in time) of the corresponding downlink frame is received from the reference cell. $N_{TA}$ for PRACH is defined as 0.

$(N_{TA}+N_{TA\ offset})\times T$, (in $T_c$ units) for other channels is the difference between UE transmission timing and the downlink timing immediately after when the last timing advance in clause 7.3 was applied. $N_{TA}$ for other channels is not changed until next timing advance is received.

When the transmission timing error between the UE and the reference timing exceeds $\pm T_c$, the UE shall be capable of changing the transmission timing according to the received downlink frame of the reference cell, and is required to adjust its timing to within $\pm$Te. The reference timing shall be $(N_{TA}+N_{TA\ offset})\times T_c$ before the downlink timing of the reference cell. All adjustments made to the UE uplink timing shall follow these rules:

1) The maximum amount of the magnitude of the timing change in one adjustment shall be $T_q$ seconds.
2) The minimum aggregate adjustment rate shall be [TBD]*$T_c$ per second.
3) The maximum aggregate adjustment rate shall be $T_q$ per [200]ms.
where the maximum autonomous time adjustment step $T_q$ is specified in Table 3.

TABLE 3

$T_q$ Maximum Autonomous Time Adjustment Step

| Subcarrier Spacing for uplink data (KHz) | $T_{q-}$ |
|---|---|
| 15 | [TBD] |
| 30 | [TBD] |
| 60 | [TBD] |
| 120 | [TBD] |

Note:
$T_S$ is the basic timing unit defined in TS 38.211

Figure 5:
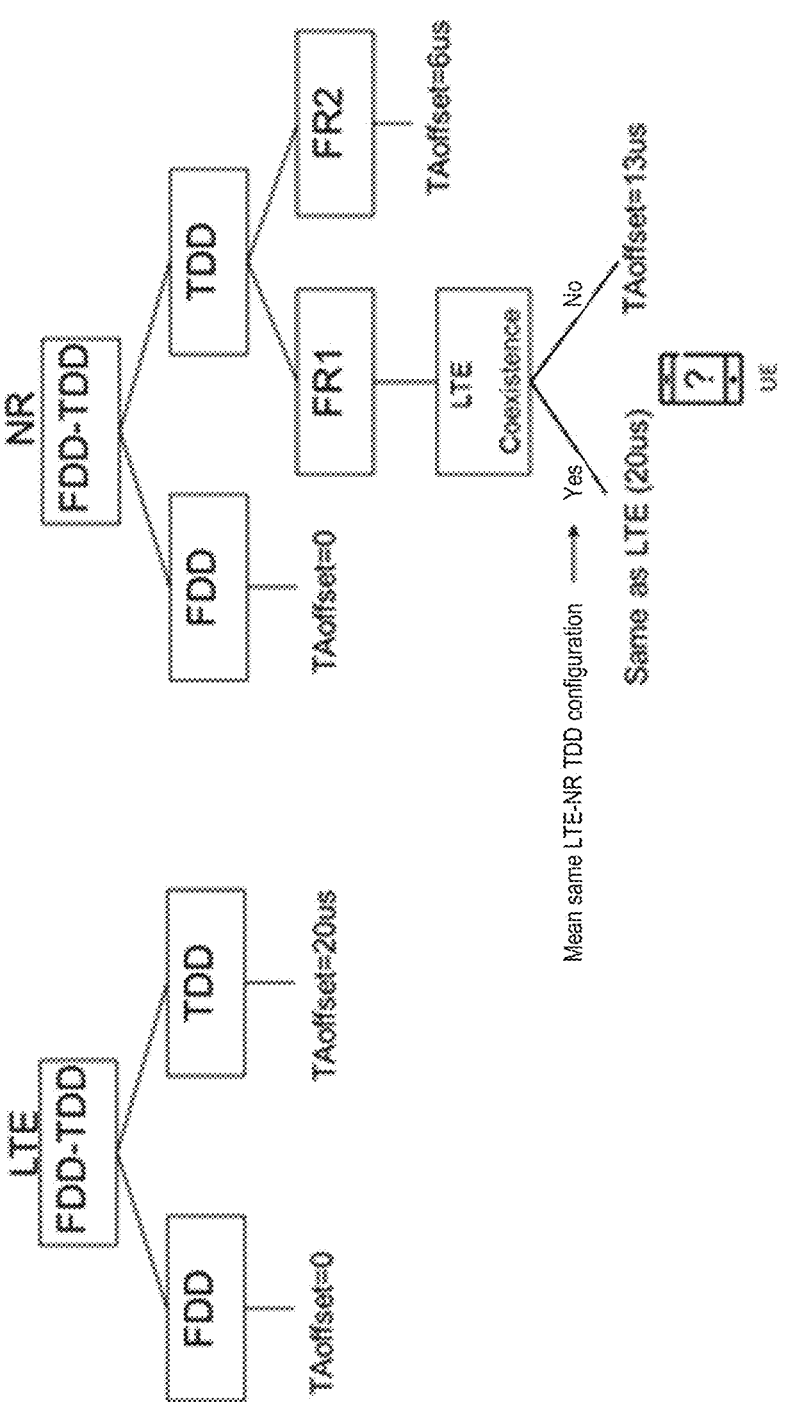
FIG. 5: Examples of different TA_offset values based on deployment and duplex modes.

For example, in higher frequencies (e.g., 24 GHz or above) with higher bandwidths, the ramping up or down of signals due to transition between TX and RX is shortened compared with lower frequencies (e.g., up to 6 GHz). Therefore, different options of TAoffset are needed based on the specified transmit transient times and based on whether NR-LTE coexistence is used or not. This is explained with examples below and also illustrated in FIG. 5.

For FDD in NR, no TA,offset is needed in any FDD frequency, so TA,offset for operation on any FDD carrier shall be 0 μs. For TDD in NR FR2, TA,offset is N1 provided that frequency of operation is within frequency range 2 (FR2). Example of N1=6 μs. Examples of FR2 is frequency above or equal to 24 GHz. As an example in FR2 no NR-LTE coexistence deployment takes place. Therefore any carrier within FR2 is only used for NR.

For TDD case in FR1, there are two main cases. Without NR-LTE coexistence, for TDD in NR TA,offset is N2 provided that frequency of operation is within frequency range 1 (FR1) and no LTE-NR coexistence is used on the TDD carrier of operation. Therefore, the TDD carrier is only used for NR. Example of N2=13 μs. Examples of FR1 is frequency up to 6 GHz. With NR-LTE coexistence, for TDD in NR TA,offset is N3 provided that frequency of operation is within frequency range 1 (FR1) and LTE-NR coexistence is used on the TDD carrier of operation, where N2<N3. Therefore, the same TDD carrier is used for LTE and NR operations (e.g., the same carrier is shared between LTE and NR). Example of N3=20 μs. Examples of FR1 is frequency up to 6 GHz., Low latency is a key feature in NR. For TDD systems this means more frequent switching between TX and RX. To minimize overhead and maximize spectrum utilization as short total GP as possible is desired which also means that the TA offset should be kept as short as possible. That is one motivation to keep N2 (e.g., 13 μs) used in NR only operation smaller than N3 (e.g., 20 μs), which is used in LTE (i.e., N2<N3).

According to some embodiments, a network node signals the TA_offset to be used by the UE as a time offset between the uplink and downlink subframes in a TDD configuration. Thus, the total guard period between downlink and uplink can be minimized.

The signaling is needed when the UE accesses or is expected to access a network (e.g., base station). For example, when the UE is transmitting or expected to transmit the random access preamble in a cell (e.g., during initial access or cell change procedure).

Figure 6:
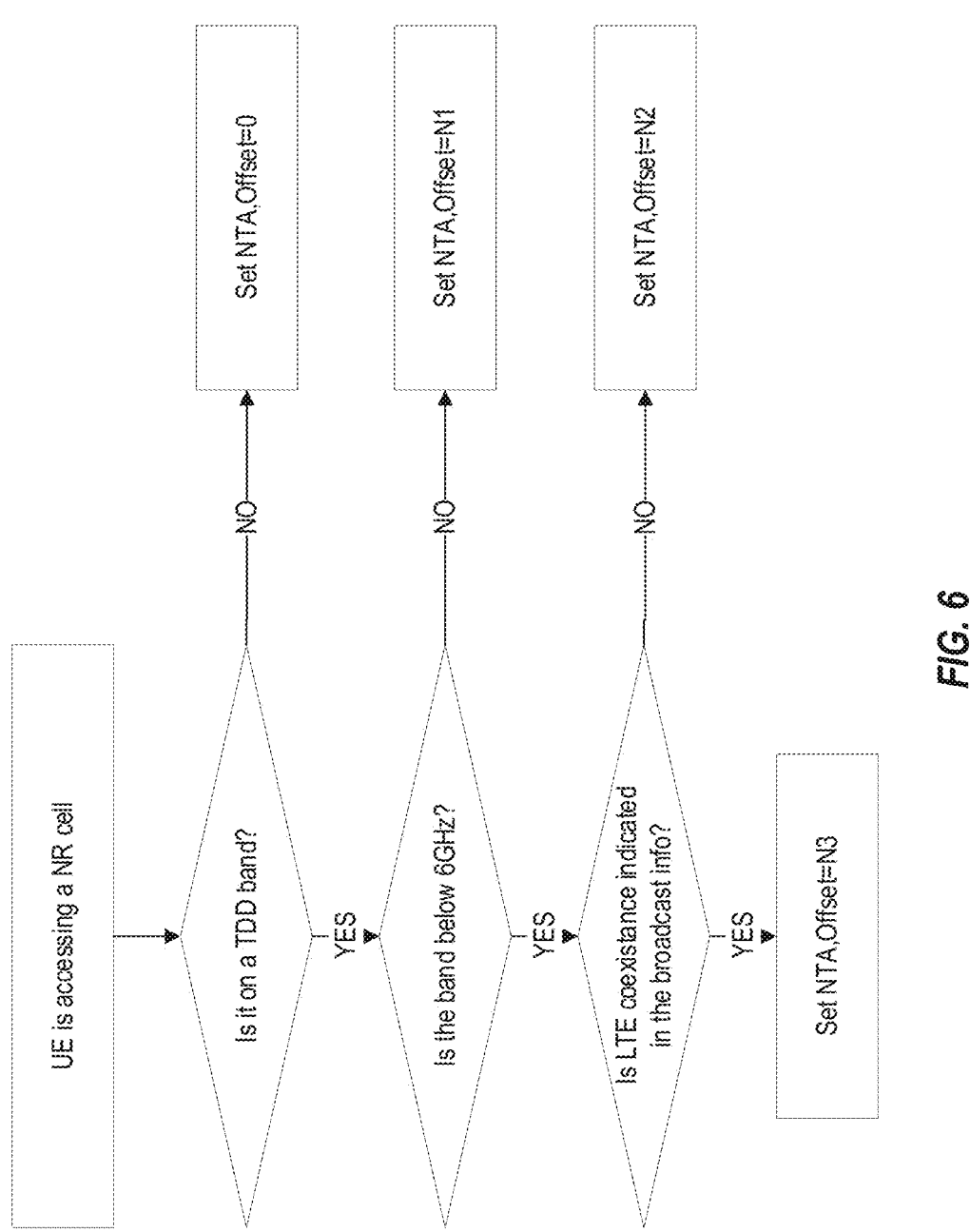
FIG. 6: Flow diagram illustrating an example method in a UE for determining a TA offset.

In some embodiments, the network node sends information (e.g., one bit in NR broadcast information in broadcast channel) which tells the UE whether the NR cell is coexisting with LTE on that carrier. Examples of broadcast channels are MIB transmitted over PBCH, SIB transmission (such as SIB1) etc. Based on the received indication from the network node (as shown in the flowchart in FIG. 6) the UE can take the decision on what $N_{TA,offset}$ value to be used by the UE for transmitting signals in this cell. This will then be based on if it is on a band used for TDD, below or higher than 6 GHz and finally whether the bit in the broadcast information indicates that the carrier is coexisting with LTE cells. As an example indicated bit 0 and bit 1 may represent NR operation on a carrier without NR-LTE coexistence and with NR-LTE coexistence respectively. For example if the received information indicates that the TDD carrier on which the UE will transmit signals is used for LTE-NR coexistence (e.g. indicated bit=1) then the UE shall select $N_{TA,offset}$ as N3; otherwise (e.g. indicated bit=0) it shall select $N_{TA,offset}$ as N2. The values of N1, N2 and N3 can be pre-defined in the standard.

The information sent by the network node can be associated with each carrier or for group of carriers. The network may configure or deconfigure a carrier for LTE-NR coexistence based on the need basis. Therefore, the network node may update the signaled information for enabling the UE to apply the latest and correct value of the TA_offset when accessing the cell.

The signaling message may also be transmitted by the network node in a cell change command (e.g. HO message); for example in a UE specific message or dedicated signaling. This will enable the UE to determine the $N_{TA,offset}$ value to be used by the UE for transmitting signals in the target cell for doing the cell change.

In particular embodiments, the TA,offset between downlink and uplink in the UE can be set as typical values for each scenario. The actual offsets are in this case can be defined in the specification and are thereby fixed by the scenario. In a TDD case below 6 GHz coexisting with an LTE cell the $N_{TA,offset}$ is set to be equal to the offset defined in LTE, N3=20 μs. In case of NR TDD below 6 GHz without coexistence with LTE the offset can be decreased to smaller value e.g. N2=13 μs. But if TDD is used and the frequency band is higher than 6 GHz the offset can be further decreased to e.g. N1=6ps.

One example on how the indication in SIB1 for the first embodiment can be specified is given here. The first example is to add the timingAdvanceOffset in ServingCell-ConfigCommon in 38.331 indicating all three possible off-sets:

1timingAdvanceOffset ENUMERATED {x0, x39936, x25560, x11776}

This costs 2 bit. Another option is to add a parameter LTE-NR-Coexistence. If present, the field indicates that a TDD serving cell in FR1 is subject to LTE-NR coexistence and that the UE shall apply a N_TA offset of 39936. Alternatively, if the specification of the actual offset is done in 38.133, then LTE-NR-Coexistence, if present, indicates that a TDD serving cell in FR1 is subject to LTE-NR coexistence and that the UE shall apply a N_TA offset as specified in section 7.1.1 in TS 38.133. The parameter may be indicated as LTE-NR-Coexistence     ENUMERATED     {true}
    OPTIONAL, —Cond TDD-FR1

The parameter LTE-NR-Coexistence shall only be valid for TDD cells in FR1, therefore the following needs to be added.

TDD-FR1: The field is optionally present for a serving cell in unpaired spectrum operating in the frequency range (FR) 1. Otherwise, the field is absent.

Figure 7:
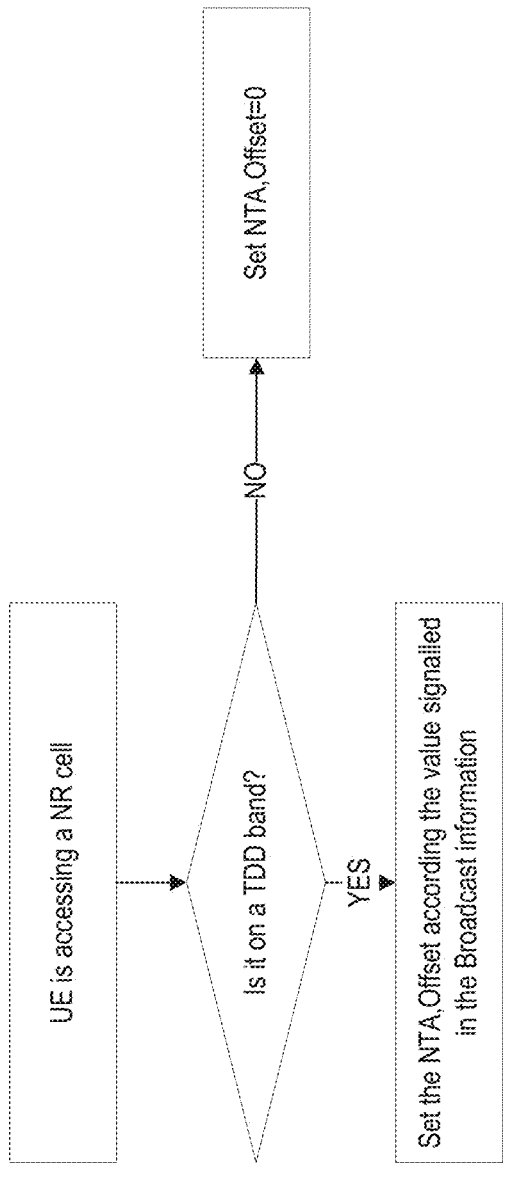
FIG. 7: Flow diagram illustrating another example method in a UE for determining a TA offset.

In some embodiments, the network node sends the actual $N_{TA,offset}$ (e.g., 13 μs, 15 μs, etc.) in the broadcast information to the UE. The $N_{TA,offset}$ is signaled in a similar way as the timing alignment is signaled in LTE connected mode. This proposal cost more signaling than embodiment 1 but the benefit with this proposal is that the guard period can be minimized based on both cell size, base station implementation, etc. By that the capacity can be further optimized. This also leads to more flexibility in the network. An example is illustrated in FIG. 7.

In some embodiments, the network nodes collect performance statistics from the different UE connected to the gNB and eNB in the network. If an interference condition is detected and if comparison with thresholds show that the interference condition is persistent in time the operator can be notified through an O&M management system that a potential coexistence problem exists between LTE and NR. This information could also be automatically used in a SON sense to change the TA_offset configuration of a site or a group of sites and then check if the interference condition will cease. If the interference ceased then the change to TA_Offset is made permanent and the operator is notified through the O&M management system.

Figure 8:
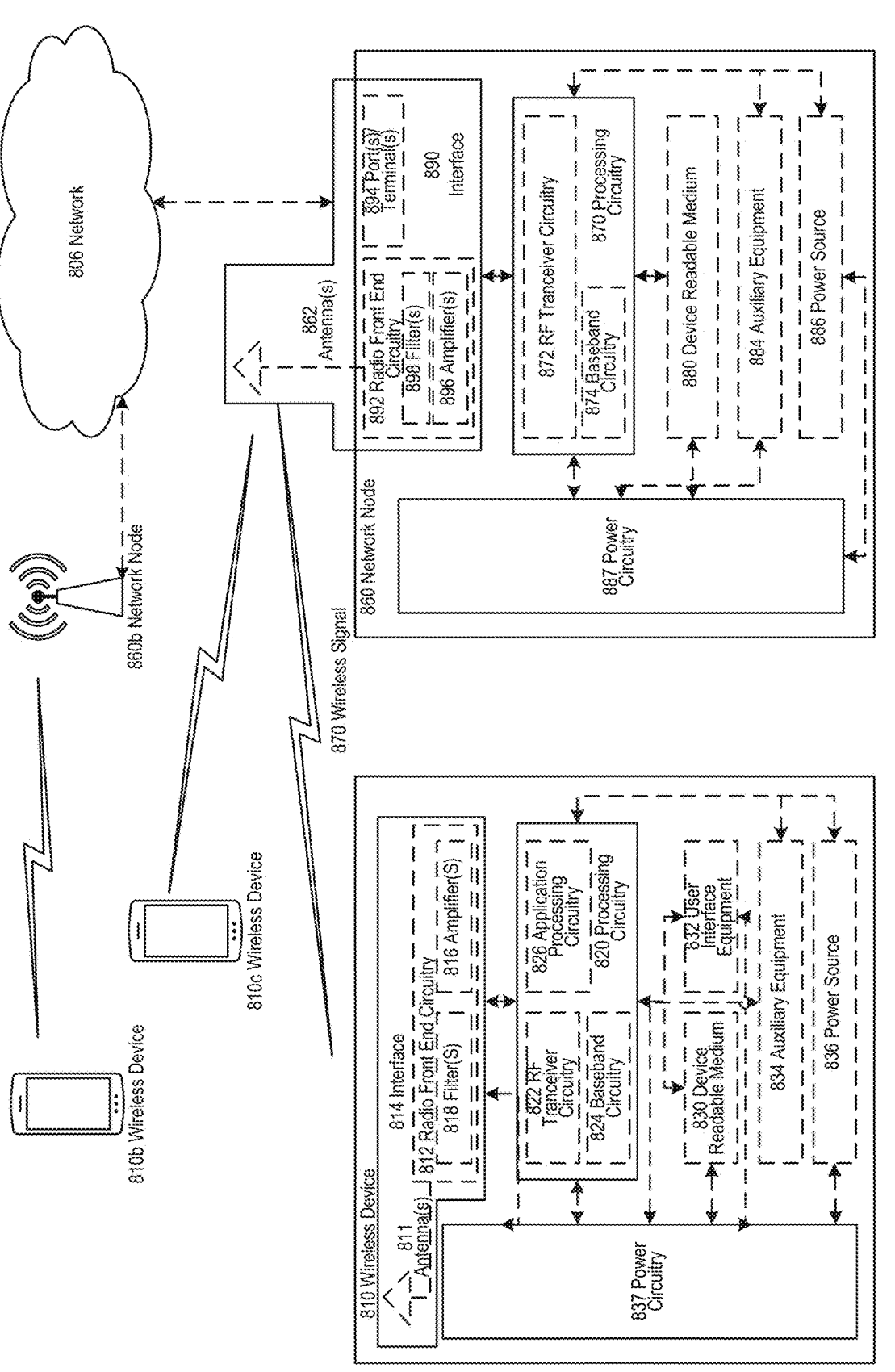
FIG. 8: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860*b*, and WDs 810, 810*b*, and 810*c*. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units.

In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signaling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
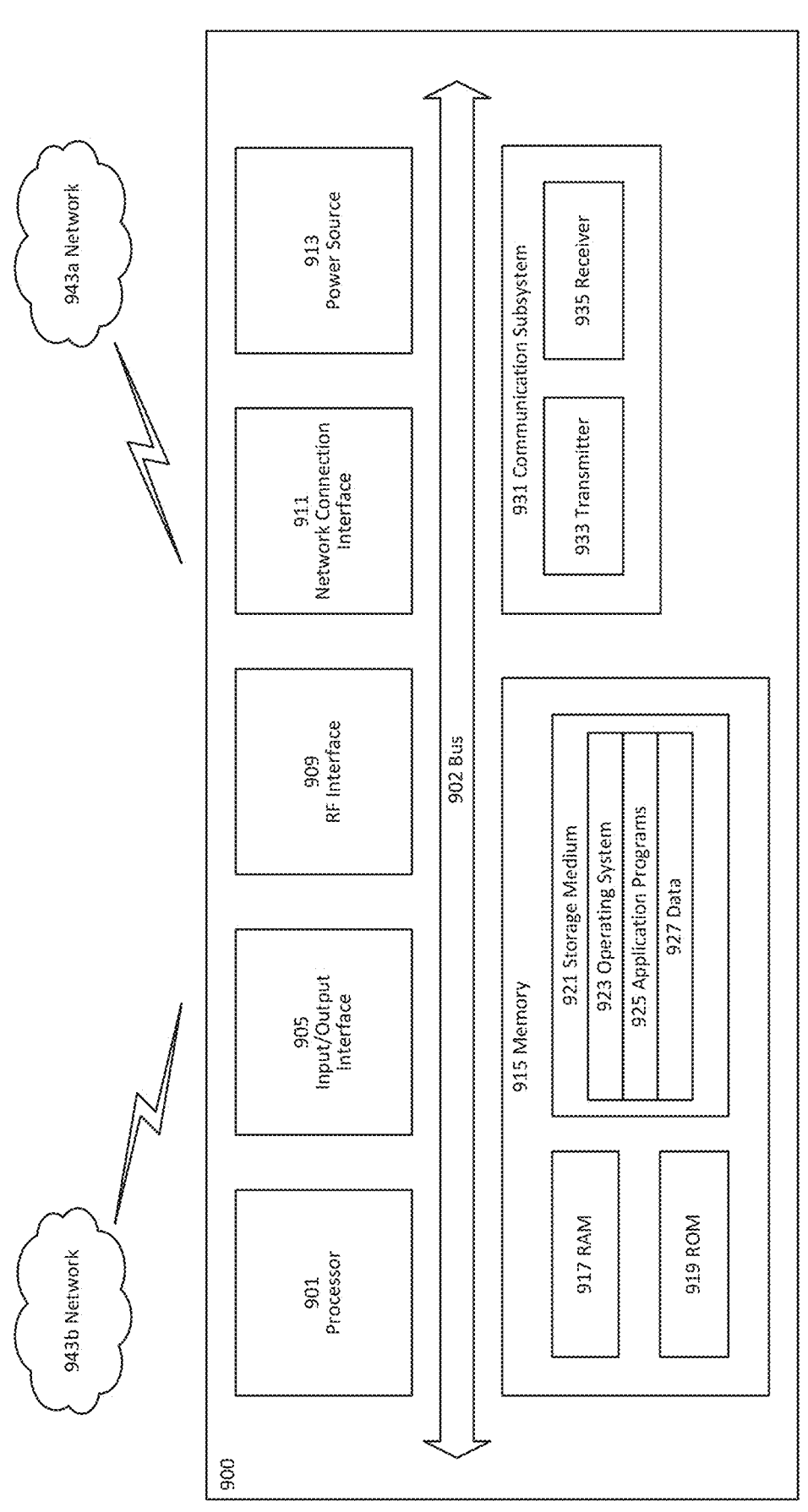
FIG. 9: User Equipment in accordance with some embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 9200 may be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943*b* using communication subsystem 931. Network 943*a* and network 943*b* may be the same network or networks or different network or networks. Communication subsystem 931 may be configured to include one or more transceivers used to communicate with network 943*b*. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943*b* may encompass wired and/or wireless networks such as a local-area network (LAN), a wide-area network (WAN), a computer network, a wireless network, a telecommunications network, another like network or any combination thereof. For example, network 943*b* may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
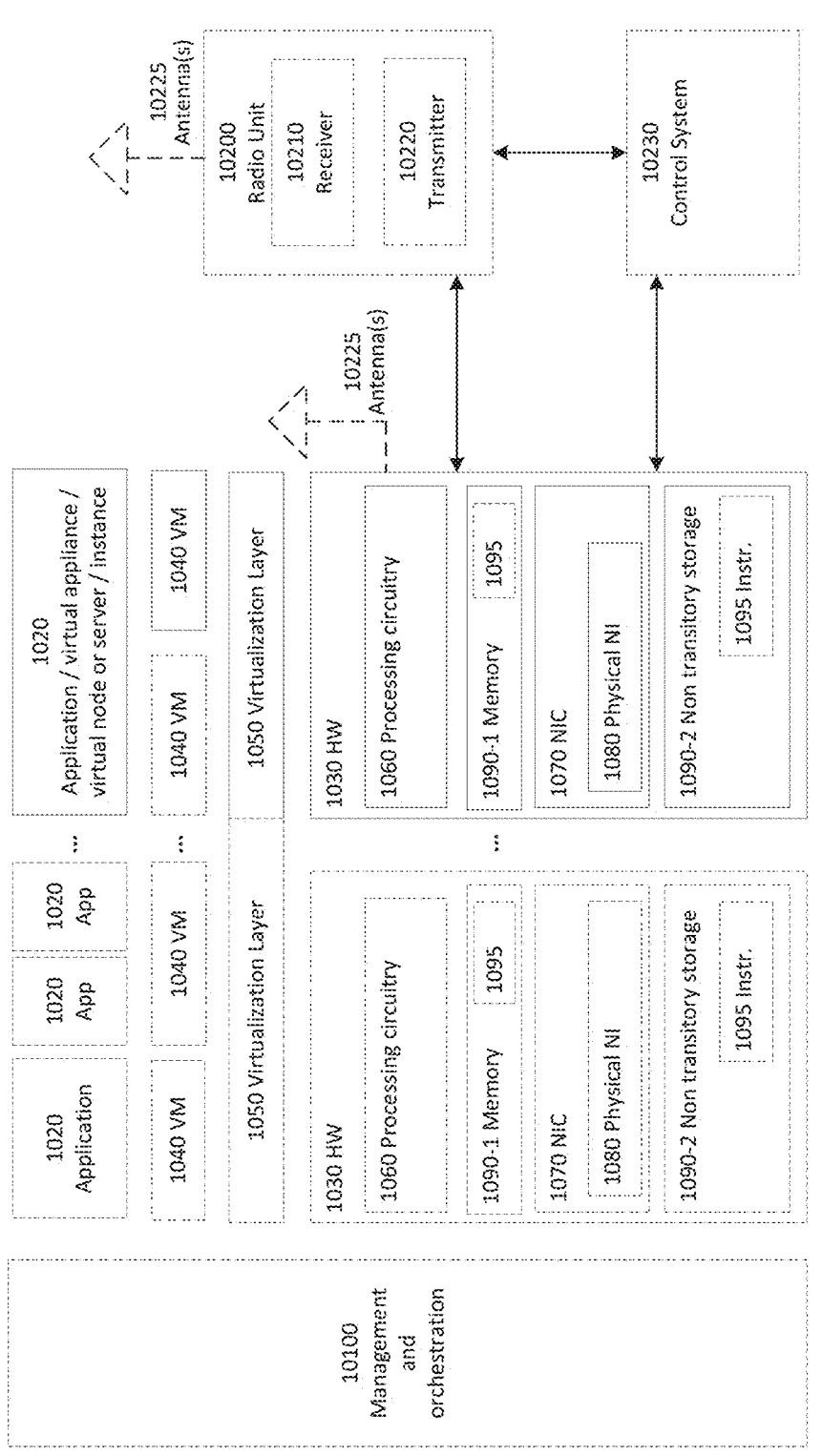
FIG. 10: Virtualization environment in accordance with some embodiments.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be effected with the use of control system 10230 which may alternatively be used for communication between the hardware nodes 1030 and radio units 10200.

Figure 11:
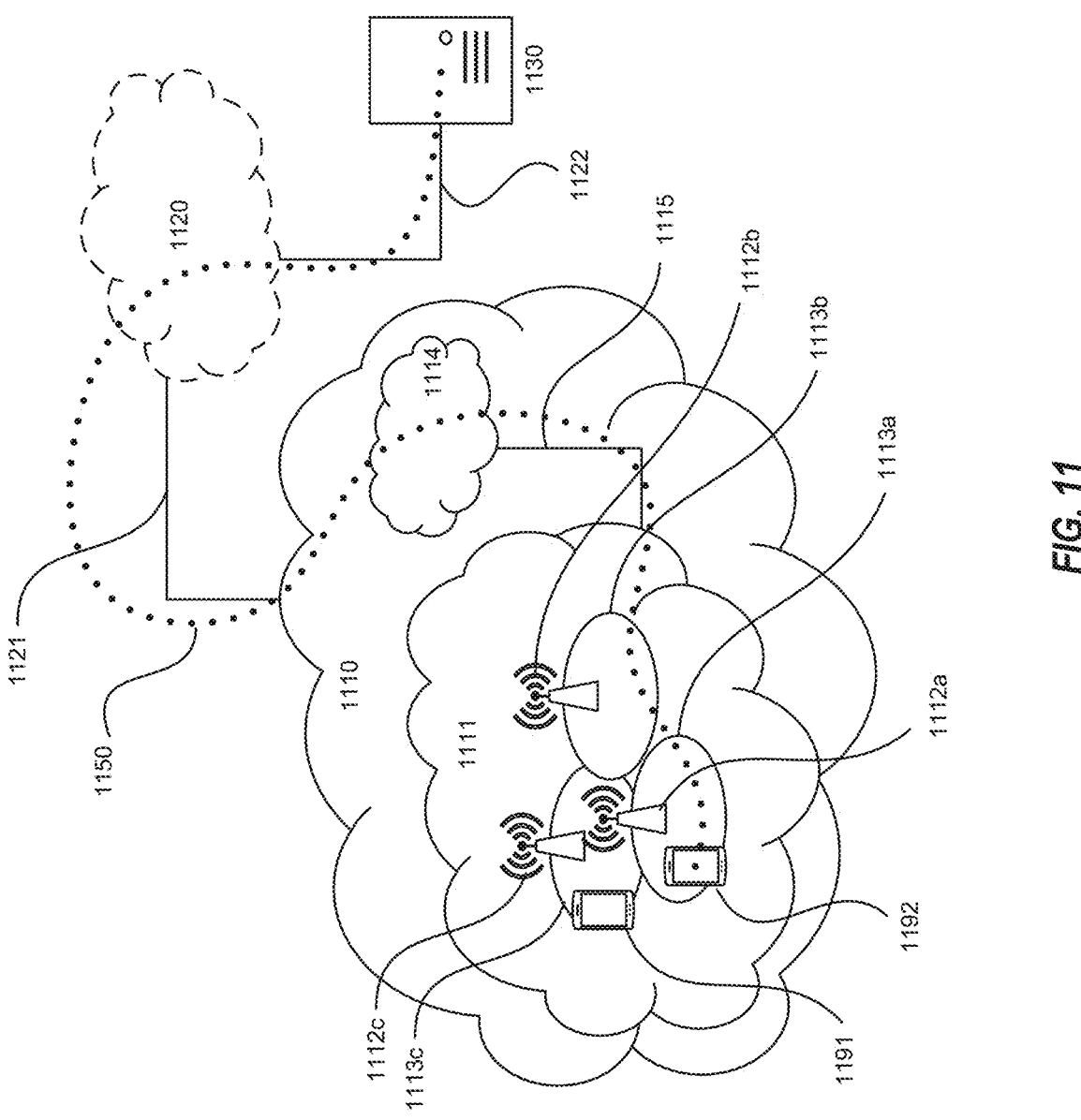
FIG. 11: Telecommunication network connected via an intermediate network to a host computer in accordance with some embodiments.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

Figure 12:
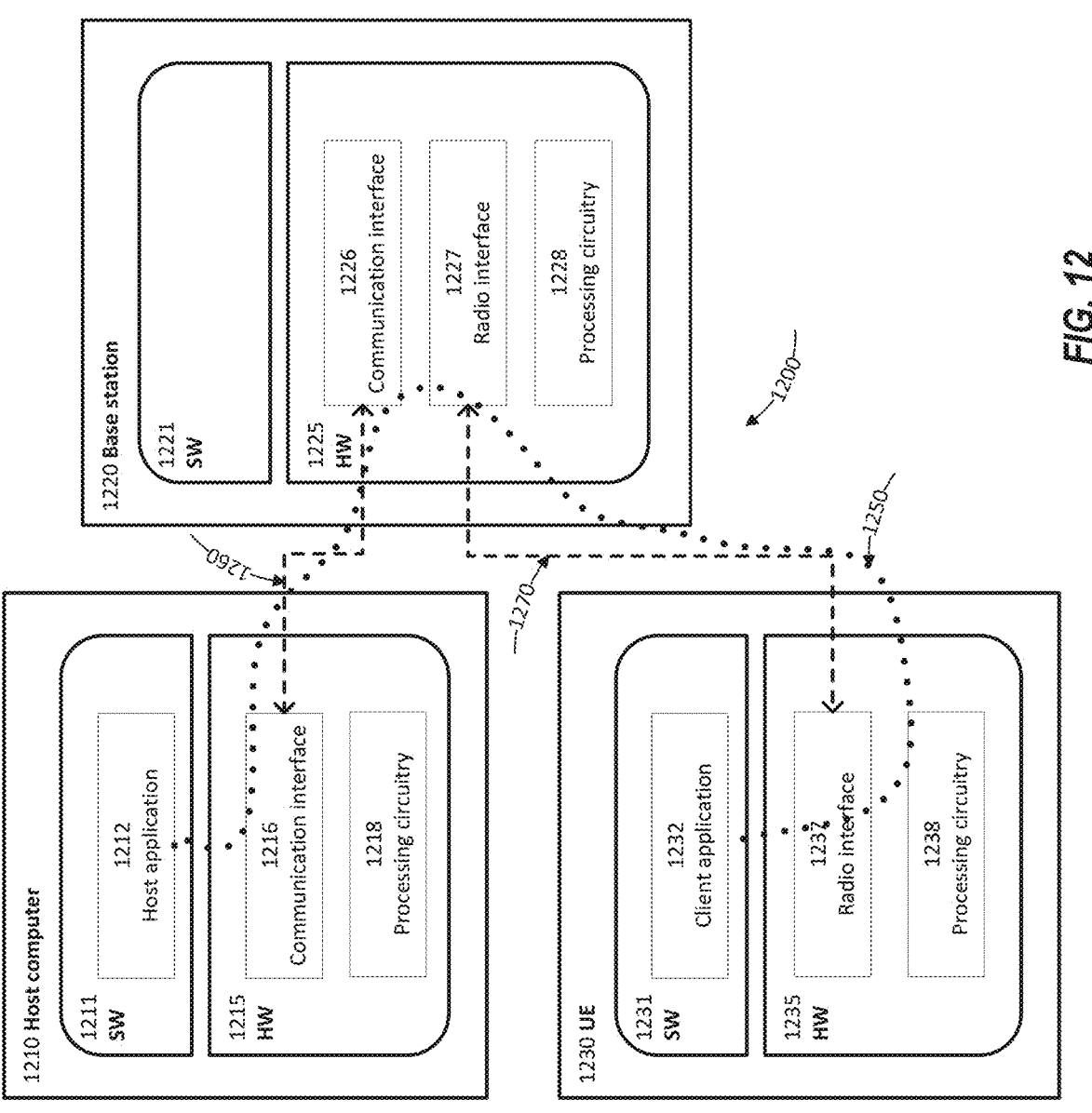
FIG. 12: Host computer communicating via a base station with a user equipment over a partially wireless connection in accordance with some embodiments.

It is noted that host computer 1210, base station 1220 and UE 1230 illustrated in FIG. 12 may be similar or identical to host computer 1130, one of base stations 1112*a*, 1112*b*, 1112*c* and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the data rate and/or latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figures 13, 14, 15, 16:
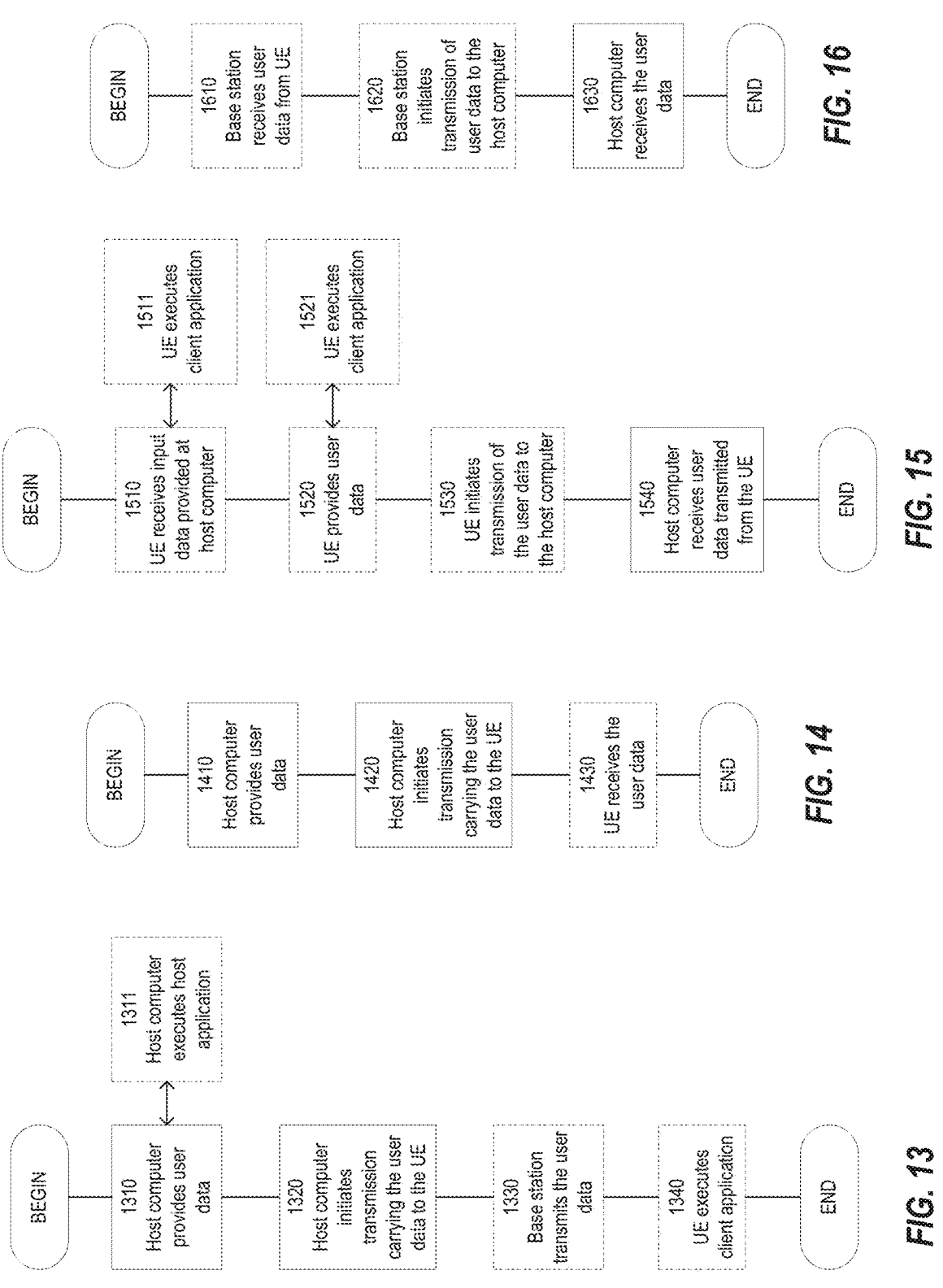
FIG. 13: Methods implemented in a communication system including a host computer, a base station and a user equipment in accordance with some embodiments.
FIG. 14: Methods implemented in a communication system including a host computer, a base station and a user equipment in accordance with some embodiments.
FIG. 15: Methods implemented in a communication system including a host computer, a base station and a user equipment in accordance with some embodiments.
FIG. 16: Methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

FIG. 17 depicts a method in accordance with particular embodiments, the method begins at step 1702 with a wireless device (e.g., wireless device 810) obtaining an indication of whether the network is a time division duplex (TDD) network, a carrier frequency of the network, and whether the network coexists with a long term evolution (LTE) network, according to any of the embodiments and examples described above.

At step 1704, the wireless device determines a TA offset based on the obtained information from the previous step according to any of the embodiments and examples described above.

At step 1706, the wireless device transmits an uplink transmission using the determined TA offset.

Figure 18:
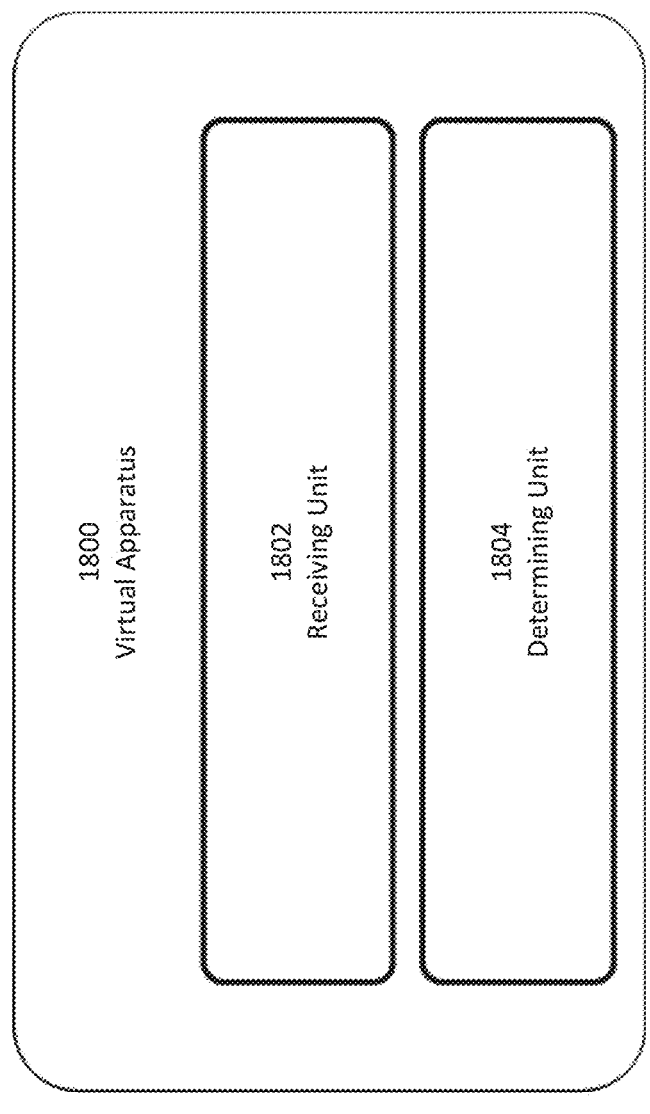
FIG. 18: Virtualization apparatus in accordance with some embodiments.

FIG. 18 illustrates a schematic block diagram of an apparatus 1800 in a wireless network (for example, the wireless network shown in FIG. 8). The apparatus may be implemented in a wireless device or network node (e.g., wireless device 810 or network node 860 shown in FIG. 8). Apparatus 1800 is operable to carry out the example method described with reference to FIG. 17 and possibly any other processes or methods disclosed herein. It is also to be understood that the method of FIG. 17 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the receiving unit 1802 and the determining unit 1804, and any other suitable units of apparatus 1800 to perform corresponding functions according one or more embodiments of the present disclosure.

As illustrated in FIG. 18, apparatus 1800 includes receiving unit 1802 and the determining unit 1804. Receiving unit 1802 is configured to receive signaling from a network node with respect to TA offset according to any of the embodiments and examples described above. Determining unit 1804 is configured to determine a TA offset according to any of the embodiments and examples described above.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. ABBREVIATIONS At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH Enhanced Physical Downlink Control Channel
E-SMLC Evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method performed by a wireless device for determining a timing advance (TA) offset in a new radio (NR) network, the method comprising:

obtaining, by broadcast signaling from a network node, an indication of whether a carrier frequency of the NR network coexists with a carrier frequency of a long term evolution (LTE) network;

determining, based on the indication obtained by broadcast signalling from the network node, a TA offset for uplink transmission; and transmitting an uplink transmission using the determined TA offset.

2. The method of claim 1, wherein the TA offset depends on a duplex mode of the frequency band of the carrier frequency of the NR network that coexists with the carrier frequency of the LTE network.

3. The method of claim 1, wherein:
the signaling includes an explicit TA offset value; and
determining the TA offset comprises using the received explicit TA offset value.

4. The method of claim 1, wherein the carrier frequency of the NR network is not a time division duplex (TDD) network and the TA offset is equal to zero.

5. The method of claim 1, wherein the NR network is a time division duplex (TDD) network, the carrier frequency of the NR network is below a threshold value, the NR network does not coexist with an LTE network, and the TA offset is equal to a first value greater than 0.

6. The method of claim 1, wherein the NR network is a time division duplex (TDD) network, the carrier frequency of the NR network is above a threshold value, the NR network does not coexist with an LTE network, and the TA offset is equal to a second value greater than 0.

7. The method of claim 1, wherein the NR network is a time division duplex (TDD) network, the carrier frequency of the NR network is above a threshold value, the NR network coexists with an LTE network, and the TA offset is equal to a third value greater than 0.

8. The method of claim 1, wherein the uplink transmission is a random access to a cell on the carrier frequency of the NR network.

9. The method of claim 1, wherein the TA offset relates uplink transmission timing with respect to downlink transmission timing in a cell belonging to the carrier frequency of the NR network.

10. A method performed by a network node for signaling a timing advance (TA) offset to a wireless device in a new radio (NR) network, the method comprising:
sending, in broadcast signalling, an indication of whether the carrier frequency of the NR network coexists with a carrier frequency of a long term evolution (LTE) network, which the wireless device uses to determine a timing advance (TA) offset for a carrier frequency of the NR network to the wireless device; and
receiving an uplink transmission sent by the wireless device using the TA offset.

11. The method of claim 10, wherein the TA offset depends on a duplex mode of the frequency band of the carrier frequency of the NR network that coexists with the carrier frequency of the LTE network.

12. The method of claim 11, wherein the duplex mode is one of: a frequency division duplex (FDD) and a time division duplex (TDD).

13. The method of claim 10, wherein the indication of the timing offset comprises an explicit indication of an amount of time.

14. The method of claim 13, wherein the NR network is not a time division duplex (TDD) network and the TA offset is equal to zero.

15. The method of claim 13, wherein the NR network is a time division duplex (TDD) network, the carrier frequency of the NR network is below a threshold value, the NR network does not coexist with an LTE network, and the TA offset is equal to a first value greater than 0.

16. The method of claim 10, wherein the indication of the timing offset comprises an indication of whether the carrier frequency of the NR network coexists with an LTE network.

17. The method of claim 10, wherein the uplink transmission is a random access to a cell on the carrier frequency of the NR network.

18. The method of claim 10, wherein the TA offset relates uplink transmission timing with respect to downlink transmission timing in a cell belonging to the carrier frequency of the NR network.

19. A wireless device for determining a timing advance (TA) offset in a new radio (NR) network, the wireless device comprising:
processing circuitry configured to perform operations comprising:
obtaining, via broadcast signaling from a network node, an indication of whether the NR network is a time division duplex (TDD) network, a carrier frequency of the NR network, and whether the NR network coexists with a long term evolution (LTE) network,
determining, based on indication, a TA offset for uplink transmission, and
transmitting an uplink transmission using the determined TA offset; and
power supply circuitry configured to supply power to the wireless device.

* * * * *